United States Patent
Kim et al.

(10) Patent No.: US 12,104,056 B2
(45) Date of Patent: Oct. 1, 2024

(54) POLYIMIDE-BASED FILM AND WINDOW COVER FILM INCLUDING THE SAME

(71) Applicants: SK Innovation Co., Ltd., Seoul (KR); SK IE Technology Co., Ltd., Seoul (KR)

(72) Inventors: Sun Kug Kim, Daejeon (KR); Hye Ri Kim, Daejeon (KR); Jin Su Park, Daejeon (KR); Hyun Joo Song, Daejeon (KR); Seung Min Jeon, Daejeon (KR)

(73) Assignees: SK Innovation Co., Ltd., Seoul (KR); SK ie technology Co., Ltd., Seoul (KR)

(*) Notice: Subject to any disclaimer, the term of this patent is extended or adjusted under 35 U.S.C. 154(b) by 527 days.

(21) Appl. No.: 17/233,619

(22) Filed: Apr. 19, 2021

(65) Prior Publication Data

US 2021/0324193 A1    Oct. 21, 2021

(30) Foreign Application Priority Data

Apr. 20, 2020  (KR) .................. 10-2020-0047312

(51) Int. Cl.
| | |
|---|---|
| *C08L 79/08* | (2006.01) |
| *C08G 73/10* | (2006.01) |
| *C08G 73/14* | (2006.01) |
| *C08J 5/18* | (2006.01) |
| *C08J 7/04* | (2020.01) |
| *C08J 7/046* | (2020.01) |
| *G02B 1/04* | (2006.01) |
| *G02B 1/11* | (2015.01) |
| *G02B 1/14* | (2015.01) |
| *G02B 1/16* | (2015.01) |
| *G06F 3/041* | (2006.01) |
| *G09F 9/30* | (2006.01) |

(52) U.S. Cl.
CPC .......... *C08L 79/08* (2013.01); *C08G 73/1039* (2013.01); *C08G 73/1078* (2013.01); *C08J 7/046* (2020.01); *C08L 2203/16* (2013.01)

(58) Field of Classification Search
None
See application file for complete search history.

(56) References Cited

U.S. PATENT DOCUMENTS

| | | | |
|---|---|---|---|
| 10,738,173 B2 | 8/2020 | Chae et al. | |
| 2013/0011651 A1 | 1/2013 | Iizumi et al. | |
| 2017/0342224 A1* | 11/2017 | Chae ....................... G09F 9/301 |
| 2018/0044475 A1* | 2/2018 | Park .................... C08G 73/1042 |
| 2018/0044476 A1 | 2/2018 | Park et al. | |
| 2019/0077960 A1 | 3/2019 | Kim et al. | |
| 2019/0375894 A1 | 12/2019 | Sakayori et al. | |
| 2020/0024401 A1* | 1/2020 | Ryu ....................... C08K 5/3475 |
| 2021/0189065 A1 | 6/2021 | Kondo | |

FOREIGN PATENT DOCUMENTS

| | | | | |
|---|---|---|---|---|
| JP | H6138320 A | | 5/1994 | |
| JP | 2003315557 A | | 11/2003 | |
| JP | 2016075894 A | * | 5/2016 | |
| KR | 1020130025391 A | | 3/2013 | |
| KR | 1020150104282 A | | 9/2015 | |
| KR | 1020170132499 A | | 12/2017 | |
| KR | 2018018307 A | * | 2/2018 | ............. C08G 73/10 |
| KR | 1020180018307 A | | 2/2018 | |
| KR | 101839293 B1 | | 3/2018 | |
| KR | 1020190039180 A | | 4/2019 | |
| KR | 1020200012648 A | | 2/2020 | |
| KR | 102100354 B1 | | 4/2020 | |
| WO | WO-2018221851 A3 | * | 2/2019 | ......... C08G 73/1039 |
| WO | 2019073972 A1 | | 4/2019 | |

* cited by examiner

*Primary Examiner* — Randy P Gulakowski
*Assistant Examiner* — Ha S Nguyen
(74) *Attorney, Agent, or Firm* — The Webb Law Firm

(57) ABSTRACT

The present invention relates to a polyimide-based film which does not substantially cause a mura or rainbow phenomenon and has excellent visibility, a window cover film including the same, and a display panel including the same.

10 Claims, No Drawings

POLYIMIDE-BASED FILM AND WINDOW COVER FILM INCLUDING THE SAME

CROSS-REFERENCE TO RELATED APPLICATION

This application claims priority to Korean Patent Application No. 10-2020-0047312 filed Apr. 20, 2020, the disclosure of which is hereby incorporated by reference in its entirety.

BACKGROUND OF THE INVENTION

Field of the Invention

The following disclosure relates to a polyimide-based film and a window cover film including the same.

DESCRIPTION OF RELATED ART

Display devices are provided with a window cover film configured to be transparent on a display panel so that a user may see a display unit from the front of the display panel, in order to protect the display panel from scratches or external shock.

Since the display devices gradually become more lightweight, thinner, and more flexible, the window cover film is produced and used in a form of a polymer film having high hardness, high stiffness, and flexible properties in place of tempered glass. As an example, a polyimide-based film may be used in some cases, but there is still a problem to be solved because the polyimide-based film has a structure in which a phase delay occurs seriously.

In addition, in a case where polarized light passes through the polyimide-based film due to the phase delay, a mura or rainbow phenomenon, or the like occurs, resulting in deterioration of visibility.

Such a window cover film formed of a polyimide-based resin is formed at the outermost portion of the display device. Therefore, it is important for the window cover film to have high display quality and not to cause distortion of light such as a mura phenomenon, a black out phenomenon in which a screen looks black at a certain angle, or a rainbow phenomenon exhibiting iridescent stains.

Moreover, as a coating layer is laminated on a substrate layer for imparting various physical properties, there are problems in that diffused reflection of light or the like occurs, visibility is deteriorated due to optical stains, and eye strain is caused when the window cover film is applied to the display device.

Therefore, a lot of effort is being made to produce a film which may solve the above problems.

RELATED ART DOCUMENT

Patent Document (Patent Document 1) Korean Patent Laid-Open Publication No. 10-2015-0104282 (Sep. 15, 2015)

SUMMARY OF THE INVENTION

An embodiment of the present invention is directed to providing a polyimide-based optical film which does not cause a rainbow or mura phenomenon, and a window cover film including the same.

Another embodiment of the present invention is directed to providing a display panel produced using a polyimide-based film which does not cause a mura phenomenon and a color stain such as rainbow and implements excellent visibility on a device screen.

Still another embodiment of the present invention is directed to providing a display panel having excellent visibility.

As a result of conducting intensive studies to solve the above problems, the present inventors found that in a case where a polyimide-based film satisfying the following Expressions 1 and 2 is produced, the polyimide-based film does not cause a mura phenomenon and a rainbow phenomenon, and a window cover film including the polyimide-based film and a display panel including the polyimide-based film have significantly improved visibility, thereby completing the present invention.

$$\mathrm{Max}[R(\theta,\psi_{0\ to\ 360°})] < R_0 \times [\sin(\theta)\cos(\theta)+5\sin(\theta)+1]^3 \quad \text{[Expression 1]}$$

wherein $R_0$ represents an in-plane phase difference ($R_{in}$) when light is incident perpendicularly to the polyimide-based film ($\theta=0°$), $\theta$ represents an inclination angle of the incident light, $\psi$ represents an azimuth angle, $R(\theta, \psi)$ represents a phase difference according to an incident angle, and $\mathrm{Max}[R(\theta, \psi_{0\ to\ 360°})]$ represents a maximum phase difference value among phase difference values measured with the fixed inclination angle $\theta$ and the azimuth angle $\psi$ of 0° to 360° at an interval of 5°.

$$1-\mathrm{Min}[R(\theta_{50°},\psi_{0\ to\ 360°})]/\mathrm{Avg}[R(\theta_{50°},\psi_{0\ to\ 360°})] \leq 50\% \quad \text{or} \quad \mathrm{Max}[R(\theta_{50°},\psi_{0\ to\ 360°})]/\mathrm{Avg}[R(\theta_{50°},\psi_{0\ to\ 360°})]-1 \leq 50\% \quad \text{[Expression 2]}$$

wherein $\mathrm{Min}[R(\theta_{50°}, \psi_{0\ to\ 360°})]$, $\mathrm{Avg}[R(\theta_{50°}, \psi_{0\ to\ 360°})]$, and $\mathrm{Max}[R(\theta_{50°}, \psi_{0\ to\ 360°})]$ represent a minimum phase difference, an average phase difference, and a maximum phase difference, respectively, among phase difference values measured with the fixed inclination angle of 50° and the azimuth angle $\psi$ of 0° to 360° at an interval of 5°.

The present invention provides a polyimide-based film having the above physical properties. The polyimide-based film hardly causes a mura phenomenon or a rainbow phenomenon such as a color stain. In the window cover film including the polyimide-based film, the above phenomena are also removed, and thus, finally, visibility on the display panel is significantly improved.

Hereinafter, in the present invention, the term "polyimide" includes polyimide or polyamide-imide.

The present invention also provides a display panel produced using the polyimide-based film having the above physical properties.

In addition, the present invention provides a polyimide-based film which does not cause a mura phenomenon or a rainbow phenomenon, a window cover film including the same, and a display panel including the same.

From the fact that the polyimide-based film satisfying the physical properties represented by the above expressions does not substantially cause a mura phenomenon, a rainbow phenomenon, or a blackout phenomenon, in the present invention, a means for obtaining the polyimide-based film satisfying Expressions 1 and 2 is not particularly limited. However, as an example, the polyimide-based film having the above physical properties may be produced by various methods such as a composition component and a composition ratio of polyimide, a stretching method, and a heat treatment method, but the present invention is not particularly limited thereto as long as the polyimide-based film has the above physical properties.

An object of the present invention is to provide a polyimide-based film used for an optical application such as a cover window, which does not cause optical stains such as a rainbow phenomenon and a mura phenomenon that occur according to a viewing angle, and has excellent optical properties such as visibility, and a display device including the same.

A uniformity of the polyimide-based film may be within ±10%.

When the polyimide-based film has a modulus measured according to ASTM D882 of 3 GPa or more, an elongation at break measured according to ASTM D882 of 8% or more, a light transmittance measured at 388 nm according to ASTM D1746 of 80% or less, a total light transmittance measured at 400 to 700 nm according to ASTM D1746 of 87% or more, a haze of 2.0% or less, a yellow index of 5.0 or less, and a value of 2.0 or less, sufficient mechanical properties, weather resistance, electrical properties, and optical properties are implemented when being installed at an outer portion of the display panel, which is preferable.

An example of the means for obtaining the polyimide-based film of the present invention is as follows, but the present invention is not limited to the following description as long as the polyimide-based film satisfies the above physical properties.

The polyimide-based film may include a unit derived from a fluorine-based aromatic diamine, a unit derived from an aromatic dianhydride, and a unit derived from an aromatic diacid dichloride.

The polyimide-based film may further include a unit derived from an alicyclic dianhydride.

A thickness of the polyimide-based film may be 10 to 500 μm.

In another general aspect, a window cover film includes the polyimide-based film satisfying the physical properties represented by Expressions 1 and 2; and a coating layer formed on the polyimide-based film.

The coating layer may be one or more selected from a hard coating layer, an antistatic layer, an anti-fingerprint layer, an anti-fouling layer, an anti-scratch layer, a low-refractive layer, an anti-reflective layer, and an impact absorption layer.

In still another general aspect, a flexible display panel includes the polyimide-based film.

Other features and aspects will be apparent from the following detailed description, the drawings, and the claims.

DESCRIPTION OF THE INVENTION

Hereinafter, the present invention will be described in more detail.

Unless otherwise defined, all the technical terms and scientific terms used herein have the same meanings as commonly understood by those skilled in the art to which the present invention belongs. The terms used in the description of the present invention are merely used to effectively describe a specific exemplary embodiment, but are not intended to limit the present invention.

Throughout the specification describing the present invention, unless explicitly described to the contrary, "comprising" any components will be understood to imply further inclusion of other components rather than the exclusion of any other components.

In addition, unless the context clearly indicates otherwise, the singular forms used in the specification and appended claims are intended to include the plural forms.

The term "polyimide-based resin" in the present invention includes a polyimide resin and a polyamide-imide resin. The term "polyimide-based film" is also the same as described above.

In the present invention, the meaning of a "polyamic acid solution" is the same as a "polyamic acid resin composition".

In the present invention, the meaning of a "polyimide-based resin solution" is the same as a "composition for forming a polyimide-based film" or a "polyamide-imide solution". In addition, the polyimide-based resin solution may contain a polyimide-based resin and a solvent in order to form a polyimide-based film.

As a result of conducting intensive studies to solve problems such as a mura or rainbow phenomenon and poor visibility occurring in a window cover film obtained using a polyimide-based resin according to the related art, the present inventors found that in a case where a polyimide-based film satisfies the following Expressions 1 and 2, the polyimide-based film, a window cover film produced using the polyimide-based film, and a display panel produced using the polyimide-based film do not cause the mura or rainbow phenomenon and have significantly improved visibility.

$$\text{Max}[R(\theta,\psi_{0\ to\ 360°})] < R_0 \times [\sin(\theta)\cos(\theta) + 5\sin(\theta) + 1]^3 \quad \text{[Expression 1]}$$

wherein $R_0$ represents an in-plane phase difference ($R_{in}$) when light is incident perpendicularly to the polyimide-based film ($\theta=0°$), $\theta$ represents an inclination angle of the incident light, $\psi$ represents an azimuth angle, $R(\theta, \psi)$ represents a phase difference according to an incident angle, and $\text{Max}[R(\theta, \psi_{0\ to\ 360°})]$ represents a maximum phase difference value among phase difference values measured with the fixed inclination angle $\theta$ and the azimuth angle $\psi$ of 0° to 360° at an interval of 5°.

$$1 - \text{Min}[R(\theta_{50°}, \psi_{0\ to\ 360°})] / \text{Avg}[R(\theta_{50°}, \psi_{0\ to\ 360°})] \le 50\% \text{ or}$$
$$\text{Max}[R(\theta_{50°}, \psi_{0\ to\ 360°})] / \text{Avg}[R(\theta_{50°}, \psi_{0\ to\ 360°})] - 1 \le 50\% \quad \text{[Expression 2]}$$

wherein $\text{Min}[R(\theta_{50°}, \psi_{0\ to\ 360°})]$, $\text{Avg}[R(\theta_{50°}, \psi_{0\ to\ 360°})]$, and $\text{Max}[R(\theta_{50°}, \psi_{0\ to\ 360°})]$ represent a minimum phase difference, an average phase difference, and a maximum phase difference, respectively, among phase difference values measured with the fixed inclination angle of 50° and the azimuth angle $\psi$ of 0° to 360° at an interval of 5°.

Therefore, according to the present invention, it is possible to provide a polyimide-based film which does not cause a mura phenomenon or a rainbow phenomenon.

An object of the present invention is to provide a polyimide-based film used for an optical application such as a cover window, which does not cause optical stains such as a rainbow phenomenon and a mura phenomenon that occur according to a viewing angle, and has excellent optical properties such as visibility, and a display device including the same.

According to the present invention, the polyimide-based film satisfying the conditions of Expressions 1 and 2 may be produced by various methods such as a change of a structure of polyimide, changes of a type and composition ratio of a monomer, a stretching method in a stretching step, and a heat treatment method. In the present invention, it is first recognized that the effects of the present invention may be achieved when the polyimide-based film satisfies the conditions of Expressions 1 and 2, but the present invention is not limited to a method of producing a polyimide-based film having the above physical properties.

As a non-limiting example, in a method of providing the polyimide-based film having the above physical properties, a specific process is adopted when a window cover film for a display device is produced using a polyimide-based resin, such that the above polyimide-based film may be obtained. In addition, in a case where polyimide containing a fluorine atom and an aliphatic cyclic structure is used and a specific process is adopted, the polyimide-based film of the present invention may be easily provided, but the present invention is not limited thereto.

Moreover, in the present invention, a monomer containing the fluorine atom and the aliphatic cyclic structure are contained, such that a polyimide-based film of which transparency is improved and a yellow index is reduced may also be provided, which is more preferable.

In addition, when the polyimide-based film of the present invention has a modulus measured according to ASTM D882 of 3 GPa or more, an elongation at break measured according to ASTM D882 of 8% or more, a light transmittance measured at 388 nm according to ASTM D1746 of 80% or less, a total light transmittance measured at 400 to 700 nm according to ASTM D1746 of 87% or more, a haze of 2.0% or less, a yellow index of 5.0 or less, and a b* value of 2.0 or less, the polyimide-based film has more excellent optical properties, mechanical properties, and weather resistance, which is preferable.

More specifically, the polyimide-based film may have a modulus measured according to ASTM D882 of 3 GPa or more, 5 GPa or more, 6 GPa or more, or 7 GPa or more, an elongation at break measured according to ASTM D882 of 8% or more, 12% or more, or 15% or more, a light transmittance measured at 388 nm according to ASTM D1746 of 80% or less, 70% or less, 30% or less, or 15% or less, and more specifically, 5 to 80%, 5 to 70%, 5 to 30%, or 5 to 15%, a total light transmittance measured at 400 to 700 nm according to ASTM D1746 of 87% or more, 88% or more, or 89% or more, a haze measured according to ASTM D1003 of 2.0% or less, 1.5% or less, or 1.0% or less, a yellow index measured according to ASTM E313 of 5.0 or less, 3.0 or less, or 0.4 to 3.0, and a b* value measured according to ASTM E313 of 2.0 or less, 1.3 or less, or 0.4 to 1.3. Within the above ranges, the polyimide-based film may have excellent optical properties and mechanical physical properties, and a device such as an organic light-emitting diode (OLED) may be protected from UV when the polyimide-based film is applied to a window cover film.

As an example, the polyimide-based film of the present invention may be produced by a step of discharging and applying a general polyimide-based resin solution onto a substrate such as a stainless steel belt, glass, or a film through a die, a drying step, a stretching step, and if necessary, an additional drying step after stretching. The polyimide-based film may also be produced to have the physical properties according to the present invention by changing and adjusting each of the above conditions, but the method thereof is not particularly limited.

As an example, the application step for providing the polyimide-based film of the present invention will be described. The application step is a step of applying a resin solution onto a substrate through a casting die. The polyimide-based film having the physical properties according to the present invention may be obtained by adjusting a shear rate generated when the resin solution passes through the die and an air gap which is a distance from a die lip portion to a support surface. In this case, the shear rate is determined by adjusting a discharge amount and a die lip gap, and the air gap is determined by adjusting a height of the die.

A viscosity of a general polymer solution is decreased as the shear rate is increased (shear thinning). It is preferable to maintain a shear rate at which a viscosity of the resin solution is decreased when it flows in the die. The optical properties of the present invention may be adjusted by maintaining the distance of the air gap under the above condition 0.5 to 15 times, preferably 10 times or less, and more preferably 5 times or less the thickness of the cast wet film.

In addition, the optical properties of the present invention may be obtained by adjusting the drying step.

As an example, in the drying step of the present invention, a plurality of drying regions are divided, a temperature of a drying region located at a rear stage is set to be higher than that of a drying region located immediately before the rear stage, a temperature of each of drying regions located at a rear stage except for a first drying region is set to be the same as or higher than that of each of the drying regions located immediately before each of the drying regions at the rear stage except for the first drying region, and the film is dried in the first drying step so that a content of a solvent in the dried film is adjusted to 10 to 30 wt % and then the dried film is transferred to the stretching step.

As a specific example, in a case where the drying region is divided into four stages, drying in a first drying region may be performed at 70 to 100° C. for 1 to 5 minutes, drying in a second drying region may be performed at 90 to 130° C. for 1 to 5 minutes, drying in a third drying region may be performed at 110 to 160° C. for 1 to 5 minutes, and drying in a fourth drying region may be performed at 130 to 160° C. for 1 to 5 minutes. Drying may be performed by programming a temperature of a rear stage to be the same as or higher than that of a front stage, but the present invention is not limited thereto.

In addition, in the present invention, the stretching step may be adjusted. As a non-limiting example, the stretching step may be a plurality of stretching steps. When a shrinking and stretching step is performed at a rear stage after stretching, the physical properties of the present invention may be more easily obtained, but the present invention is not limited thereto. A temperature in the stretching step is not particularly limited, but when the stretching is performed at 150 to 300° C., the effects of the present invention may be easily achieved, which is more preferable.

In the present invention, an optical film having the physical properties of the present invention may be obtained through the application step, the drying step, and the stretching step, and if necessary, the additional drying step or the heat treatment step, but the present invention is not limited thereto.

In addition, in the present invention, it is more preferable to provide a polyimide-based optical film having a modulus measured according to ASTM D882 of 3 GPa or more, an elongation at break measured according to ASTM D882 of 8% or more, a light transmittance measured at 388 nm according to ASTM D1746 of 80% or less, a total light transmittance measured at 400 to 700 nm according to ASTM D1746 of 87% or more, a haze of 2.0% or less, a yellow index of 5.0 or less, and a value of 2.0 or less. Since the polyimide-based optical film is disposed at an outer portion of a display device, when the polyimide-based optical film has the above physical properties, all of mechanical properties, surface properties, weather resistance, optical properties, and thermal properties are satisfied, which is preferable.

Another exemplary embodiment of the present invention provides a display device including the optical film according to an exemplary embodiment of the present invention.

Next, the polyimide-based resin of the present invention will be described.

Next, an example of the polyimide-based resin of the present invention will be described, and any polyimide-based resin may be used as long as a polyamide-based film satisfying Expressions 1 and 2 may be provided.

In addition, as a polyimide-based film having sufficient physical properties to be used in a window cover film, the present invention provides, for example, a polyimide-based film having a modulus measured according to ASTM D882 of 3 GPa or more, an elongation at break measured according to ASTM D882 of 8% or more, a light transmittance measured at 388 nm according to ASTM D1746 of 80% or less, a total light transmittance measured at 400 to 700 nm according to ASTM D1746 of 87% or more, a haze of 2.0% or less, a yellow index of 5.0 or less, and a value of 2.0 or less.

In a case where the polyimide-based resin of an exemplary embodiment of the present invention is a polyimide-based resin which is produced in a state where a fluorine-based aromatic diamine and an aliphatic cyclic (alicyclic) dianhydride are contained and contains a fluorine atom and an aliphatic cyclic structure, the polyimide-based film has excellent thermal properties, modulus, and optical properties, which may be more effective in improving the visibility of the polyimide-based film of the present invention. However, although the polyimide-based resin does not have such a structure, a polyimide-based film having excellent thermal properties, modulus, and optical properties may be obtained by adjusting a composition component and composition ratio of each of the monomers, polymerization conditions, drying conditions, stretching conditions, and heat treatment conditions. Therefore, the present invention is not limited thereto.

As an example, polyimide consisting of the monomers described above will be described. As an example, the polyimide-based resin may be derived from a fluorine-based aromatic diamine, an aromatic dianhydride, and an aromatic diacid dichloride. It is more preferable to use a tetrapolymer derived from a fluorine-based aromatic diamine, an aromatic dianhydride, an alicyclic dianhydride, and an aromatic diacid dichloride.

Specifically, the polyimide-based resin may be a resin obtained by preparing polyamic acid in a state where a fluorine-based aromatic diamine, an aromatic dianhydride, an alicyclic dianhydride, and an aromatic diacid dichloride are contained, and imidizing the polyamic acid in the presence of an imidization catalyst and a dehydrating agent at a low temperature of 150° C. or lower.

In an exemplary embodiment of the present invention, a thickness of the polyimide-based film may be 5 to 300 µm.

In addition, in an exemplary embodiment of the present invention, the polyimide-based film may have a modulus measured according to ASTM D882 of 3 GPa or more, 4 GPa or more, or 5 GPa or more, an elongation at break measured according to ASTM D882 of 8% or more, 12% or more, or 15% or more, a light transmittance measured at 388 nm according to ASTM D1746 of 80% or less, 70% or less, 30% or less, or 15% or less, and more specifically, 5 to 80%, 5 to 70%, 5 to 30%, or 5 to 15%, a total light transmittance measured at 400 to 700 nm according to ASTM D1746 of 87% or more, 88% or more, or 89% or more, a haze measured according to ASTM D1003 of 2.0% or less, 1.5% or less, or 1.0% or less, a yellow index measured according to ASTM E313 of 5.0 or less, 3.0 or less, or 0.4 to 3.0, and a b* value measured according to ASTM E313 of 2.0 or less, 1.3 or less, or 0.4 to 1.3. Therefore, the polyimide-based film of the present invention has excellent physical properties sufficient to replace tempered glass according to the related art or a polyimide-based film according to the related art as a window cover film.

In an exemplary embodiment of the present invention, the polyimide-based film is formed of a polyimide-based resin, and in particular, is formed of a polyimide-based resin having a polyamide-imide structure.

In an exemplary embodiment of the present invention, as an example of the polyamide-imide-based resin having the fluorine atom and the aliphatic cyclic structure, in a case where an amine-terminated polyamide oligomer derived from a first fluorine-based aromatic diamine and an aromatic diacid dichloride is produced, and a polyamide-imide polymer is produced by polymerizing the amine-terminated polyamide oligomer and monomers derived from a second fluorine-based aromatic diamine, an aromatic dianhydride, and an alicyclic dianhydride, the object of the present invention is better achieved, which is preferable. The types of the first fluorine-based aromatic diamine and the second fluorine-based aromatic diamine may be the same as or different from each other.

In an exemplary embodiment of the present invention, in a case where an amine-terminated oligomer in which an amide structure in a polymer chain is formed by the aromatic diacid dichloride is included as a diamine monomer, the optical physical properties may be improved, and in particular, the mechanical strength such as a modulus may also be improved. Also, dynamic bending properties may be further improved.

In an exemplary embodiment of the present invention, when the resin has a polyamide oligomer block as described above, a molar ratio of the diamine monomer including the amine-terminated polyamide oligomer and the second fluorine-based aromatic diamine to the dianhydride monomer including the aromatic dianhydride and the alicyclic dianhydride according to the present invention is preferably 1:0.8 to 1.2, more preferably 1:0.9 to 1, and still more preferably 1:1. In addition, a content of the amine-terminated polyamide oligomer with respect to the entire diamine monomer is not particularly limited, but may be 30 mol % or more, preferably 50 mol % or more, and more preferably 70 mol % or more. In this case, the polyimide-based film may satisfy the physical properties represented by Expressions 1 and 2 and may have excellent mechanical physical properties and yellow index, which is preferable. In addition, a composition ratio of the aromatic dianhydride to the alicyclic dianhydride is not particularly limited, but is preferably 30 to 80 mol %:70 to 20 mol %, in consideration of achieving the transparency, the yellow index, and the mechanical physical properties together with the effects of the present invention, but the present invention is not limited thereto.

In addition, as another example, the polyamide-imide-based resin containing the fluorine atom and the aliphatic cyclic structure may be a polyamide-imide-based resin obtained by mixing, polymerizing, and imidizing a fluorine-based aromatic diamine, an aromatic dianhydride, an alicyclic dianhydride, and an aromatic diacid dichloride. Such a resin has a random copolymer structure. A content of the aromatic diacid dichloride may be 40 moles or more, and preferably 50 to 80 moles, with respect to 100 moles of diamine. A content of the aromatic dianhydride may be 10 to 50 moles with respect to 100 moles of the diamine. A content of the alicyclic dianhydride may be 10 to moles with respect to 100 moles of the diamine. The polyamide-imide-based resin may be produced by polymerizing a diacid dichloride and a dianhydride with respect to the diamine monomer in a molar ratio of 1:0.8 to 1.1, and more preferably 1:1. The diacid dichloride and the dianhydride with respect to the diamine monomer are preferably polymerized in a molar ratio of 1:1. In an exemplary embodiment of the present invention, as the fluorine-based aromatic diamine, a mixture of 2,2'-bis(trifluoromethyl)-benzidine and another known aromatic diamine may be used, and 2,2'-bis(trifluoromethyl)-benzidine may be used alone.

The aromatic dianhydride may be one or a mixture of two or more of 4,4'-hexafluoroisopropylidene diphthalic anhydride (6FDA), biphenyltetracarboxylic dianhydride (BPDA), oxydiphthalic dianhydride (ODPA), sulfonyl diphthalic anhydride ($SO_2DPA$), (isopropylidenediphenoxy) bis (phthalic anhydride) (6HDBA), 4-(2,5-dioxotetrahydrofuran-3-yl)-1,2,3,4-tetrahydronaphthalene-1,2-dicarboxylic dianhydride (TDA), 1,2,4,5-benzene tetracarboxylic dianhydride (PMDA), benzophenone tetracarboxylic dianhydride (BTDA), bis(carboxyphenyl) dimethyl silane dianhydride (SiDA), and bis(dicarboxyphenoxy) diphenyl sulfide dianhydride (BDSDA), but the present invention is not limited thereto.

As an example, the alicyclic dianhydride may be one or a mixture of two or more selected from the group consisting of 1,2,3,4-cyclobutanetetracarboxylic dianhydride (CBDA), 5-(2,5-dioxotetrahydrofuryl)-3-methylcyclohexene-1,2-dicarboxylic dianhydride (DOCDA), bicyclo[2.2.2]oct-7-ene-2,3,5,6-tetracarboxylic dianhydride (BTA), bicyclooctene-2,3,5,6-tetracarboxylic dianhydride (BODA), 1,2,3,4-cyclopentanetetracarboxylic dianhydride (CPDA), 1,2,4,5-cyclohexanetetracarboxylic dianhydride (CHDA), 1,2,4-tricarboxy-3-methylcarboxycyclopentane dianhydride (TMDA), 1,2,3,4-tetracarboxycyclopentane dianhydride (TCDA), and derivatives thereof.

The aromatic diacid dichloride may be one or a mixture of two or more selected from the group consisting of isophthaloyl dichloride (IPC), terephthaloyl dichloride (TPC), [1,1'-biphenyl]-4,4'-dicarbonyl dichloride (BPC), 1,4-naphthalene dicarboxylic dichloride (NPC), 2,6-naphthalene dicarboxylic dichloride (NTC), 1,5-naphthalene dicarboxylic dichloride (NEC), and derivatives thereof, but the present invention is not limited thereto.

In the present invention, an organic solvent is used in the polymerization for a solution polymerization reaction. A type of the organic solvent is not particularly limited, but it is preferable to use one or two or more polar solvents selected from dimethylacetamide (DMAc), N-methyl-2-pyrrolidone (NMP), dimethylformamide (DMF), dimethyl sulfoxide (DMSO), acetone, ethyl acetate, and m-cresol.

As an example, the polymerization method may include a step of producing an oligomer by reacting a fluorine-based aromatic diamine with an aromatic diacid dichloride, a step of preparing a polyamic acid solution by reacting the produced oligomer with a fluorine-based aromatic diamine, an aromatic dianhydride, and an alicyclic dianhydride, a step of producing a polyamide-imide resin by imidizing the polyamic acid solution, and a step of preparing a polyamide-imide solution obtained by dissolving the polyamide-imide resin in an organic solvent.

The step of producing the oligomer may include a step of reacting the fluorine-based aromatic diamine with the aromatic diacid dichloride in a reactor, and a step of purifying and drying the obtained oligomer. In this case, a molar ratio of the fluorine-based aromatic diamine to the aromatic diacid dichloride may be 1.01 to 2 in order to produce an amine-terminated polyamide oligomer monomer. A molecular weight of the oligomer monomer is not particularly limited, but, for example, when a weight average molecular weight thereof is within a range of 1,000 to 3,000 g/mol, the polyimide-based film may have more excellent physical properties.

Next, the step of preparing the polyamic acid solution may be performed by a solution polymerization reaction in which the produced oligomer is reacted with the fluorine-based aromatic diamine, the aromatic dianhydride, and the alicyclic dianhydride in an organic solvent. As an example, the organic solvent used for the polymerization reaction in this case may be one or two or more polar solvents selected from dimethylacetamide (DMAc), N-methyl-2-pyrrolidone (NMP), dimethylformamide (DMF), dimethyl sulfoxide (DMSO), ethyl cellosolve, methyl cellosolve, acetone, ethyl acetate, and m-cresol.

Next, the step of producing the polyamide-imide resin by imidizing the polyamic acid solution may be performed through chemical imidization. More preferably, the polyamic acid solution is chemically imidized using pyridine and acetic anhydride. Subsequently, the polyamic acid solution may be imidized using an imidization catalyst and a dehydrating agent at a low temperature of 150° C. or lower, preferably 100° C. or lower, and specifically, 50 to 150° C.

In the case where the polyamic acid solution is imidized by such a method, mechanical physical properties may be uniformly imparted to the entire film as compared to a case where the polyamic acid solution is imidized by heat at a high temperature.

One or two or more selected from pyridine, isoquinoline, and β-quinoline may be used as the imidization catalyst. In addition, one or two or more selected from acetic anhydride, phthalic anhydride, and maleic anhydride may be used as the dehydrating agent, but the present invention is not limited thereto.

In addition, the polyamide-imide resin may be produced by mixing the polyamic acid solution with an additive such as a retardant, a tackifier, an inorganic particle, an antioxidant, an ultraviolet stabilizer, or a plasticizer.

In addition, after the imidization is performed, the resin may be purified using the solvent to obtain a solid content, and the solid content may be dissolved in a solvent, thereby obtaining a polyamide-imide solution. The solvent may include, for example, N,N-dimethylacetamide (DMAc) and the like, but the present invention is not limited thereto.

Next, an exemplary embodiment of a method of producing a window cover film including the polyimide-based optical film satisfying the physical properties represented by Expressions 1 and 2 will be described.

The present invention provides a window cover film including the polyimide-based film and a hard coating layer formed on the polyimide-based film.

When the hard coating layer is laminated on the polyimide-based film having a specific change rate range of a surface hardness, it is possible to provide a window cover film which has significantly improved visibility and does not cause deterioration in the number of contour lines.

In the present exemplary embodiment, it is more preferable that the window cover film including the hard coating layer has a light transmittance measured at 388 nm according to ASTM D1746 of 80% or less, a total light transmittance measured at 400 to 700 nm according to the ASTM D1746 of 87% or more, 88% or more, or 89% or more, a haze measured according to ASTM D1003 of 1.5% or less, 1.2% or less, or 1.0% or less, a yellow index measured according to ASTM E313 of 4.0 or less, 3.0 or less, or 2.0 or less, and a b* value measured according to ASTM E313 of 2.0 or less, 1.5 or less, or 1.2 or less.

According to an exemplary embodiment of the present invention, it is possible to provide a window cover film in which various coating layers are formed other than or together with the hard coating layer to impart functionality of the window cover film.

As a specific example, the coating layer may include one or more layers selected from a hard coating layer, a restoration layer, an impact spread layer, a self-cleaning layer, an anti-fingerprint layer, an anti-scratch layer, a low-refractive layer, and an impact absorption layer, but the present invention is not limited thereto.

Although various coating layers are formed on the polyimide-based film having contour line characteristics according to the present invention, it is possible to provide a window cover film in which a mura phenomenon or a rainbow phenomenon is substantially removed.

In the present exemplary embodiment, specifically, the coating layer may be formed on one or both surfaces of the polyimide-based film.

In the present exemplary embodiment, the coating layer is formed so that a solid content is 0.01 to 200 $g/m^2$ with respect to a total area of the polyimide-based film, such that it is possible to provide a window cover film which does not cause a mura or rainbow phenomenon and has excellent visibility.

In the present exemplary embodiment, specifically, the coating layer may be formed by applying a composition for forming a coating layer containing a coating solvent onto the polyimide-based film.

The coating solvent is not particularly limited, but is preferably a polar solvent. For example, the polar solvent may be one or more solvents selected from an ether-based solvent, a ketone-based solvent, an alcohol-based solvent, an amide-based solvent, a sulfoxide-based solvent, and an aromatic hydrocarbon-based solvent. Specifically, the polar solvent may be one or more solvents selected from dimethylacetamide (DMAc), N-methyl-2-pyrrolidone (NMP), dimethylformamide (DMF), dimethyl sulfoxide (DMSO), acetone, ethyl acetate, propylene glycol methyl ether, m-cresol, methanol, ethanol, isopropanol, butanol, 2-methoxyethanol, methyl cellosolve, ethyl cellosolve, methyl ethyl ketone, methyl butyl ketone, methyl isobutyl ketone, methyl phenyl ketone, diethyl ketone, dipropyl ketone, cyclohexanone, hexane, heptane, octane, benzene, toluene, and xylene.

In the present exemplary embodiment, as a method of forming the coating layer by applying the composition for forming a coating layer onto the polyimide-based film, one or more methods selected from a spin coating method, a dipping method, a spraying method, a die coating method, a bar coating method, a roll coating method, a meniscus coating method, a flexo printing method, a screen printing method, a bead coating method, an air knife coating method, a reverse roll coating method, a blade coating method, a casting coating method, and a gravure coating method, may be used, but the present invention is not limited thereto.

In the present exemplary embodiment, the hard coating layer may be an organic layer or inorganic layer alone, or an organic and inorganic mixed layer. The hard coating layer may preferably include 10 to 90 wt % of organic substances and 10 to 90 wt % of inorganic substances, but the present invention is not limited thereto. The hard coating layer may more preferably include 40 to 80 wt % of organic substances and 20 to 60 wt % of inorganic substances. Even though the hard coating layer including organic substances and inorganic substances is formed as described above, the hard coating layer has excellent bonding ability with the polyimide-based film, and the window cover film does not cause distortion of light, and in particular, does not cause a rainbow phenomenon.

In the present exemplary embodiment, the hard coating layer is not particularly limited, but may be, for example, a layer including one or more polymers selected from an acryl-based polymer, a silicon-based polymer, an epoxy-based polymer, and a urethane-based polymer.

Specifically, the hard coating layer may prevent deterioration of optical properties when being formed on the polyimide-based film and may be a layer formed of a composition for forming a coating layer containing an epoxy-siloxane resin for improving a surface hardness. Specifically, the epoxy-siloxane resin may be a siloxane resin having an epoxy group.

The epoxy group may be a cyclic epoxy group, an aliphatic epoxy group, an aromatic epoxy group, or a mixture thereof. The siloxane resin may be a polymer compound in which a silicon atom and an oxygen atom form a covalent bond.

Preferably, the epoxy-siloxane resin may be, for example, a silsesquioxane resin. Specifically, the epoxy-siloxane resin may be a compound in which an epoxy group is directly substituted for a silicon atom of a silsesquioxane compound or an epoxy group is substituted for a substituent substituted for the silicon atom.

As a non-limiting example, the epoxy-siloxane resin may be a silsesquioxane resin substituted with a 2-(3,4-epoxycyclohexyl) group or a 3-glycidoxy group.

The epoxy-siloxane resin may be produced from alkoxysilane having an epoxy group alone or hydrolysis and condensation reactions between alkoxysilane having an epoxy group and another kind of alkoxysilane, in the presence of water.

For example, the alkoxysilane compound having an epoxy group may be one or more selected from 2-(3,4-epoxycyclohexyl) ethyltrimethoxysilane, 2-(3,4-epoxycyclohexyl)ethyltriethoxysilane, and 3-glycidoxypropyltrimethoxysilane.

In the present exemplary embodiment, a weight average molecular weight of the epoxy-siloxane resin may be 1,000 to 20,000 g/mol, but is not limited thereto. When the epoxy-siloxane resin has the weight average molecular weight in the above range, the epoxy-siloxane resin has an appropriate viscosity. Therefore, it is possible to improve flowability, coatability, curing reactivity, and the like of the composition for forming a coating layer, and to improve the surface hardness of the hard coating layer.

In the present exemplary embodiment, the composition for forming a coating layer may include an epoxy-silane resin, a crosslinking agent, and an initiator, and may further include an additional epoxy-silane monomer or a second epoxy-silane resin different from the above epoxy-silane resin, if necessary. The epoxy-silane resin in the composition for forming a coating layer may be included in an amount of 20 to 65 wt %, and preferably in an amount of 20 to 60 wt %, with respect to the entire composition, but the present invention is not limited to the above range. Within the above range, the hard coating layer may have an excellent surface hardness and flowability and uniform curing is thus induced to prevent physical defects such as cracks due to partial over crosslinking, which is preferable.

In the present exemplary embodiment, the crosslinking agent is not particularly limited, but may be one or two or more selected from (3,4-epoxycyclohexyl)methyl-3',4'-epoxycyclohexanecarboxylate, digylcidyl 1,2-cyclohexanedicarboxylate, 2-(3,4-epoxycyclohexyl-5,5-spiro-3,4-epoxy)

cyclohexane-meta-dioxane, bis(3,4-epoxycyclohexylmethyl)adipate), bis(3,4-epoxy-6-methylcyclohexyl)adipate, 3,4-epoxy-6-methylcyclohexylmethyl-3',4'-epoxy-6'-methylcyclohexanecarboxylate, 1,4-cyclohexanedimethanol bis(3,4-epoxycyclohexanecarboxylate), ethylene bis(3,4-epoxycyclohexanecarboxylate), 3,4-epoxycyclohexylmethyl (meth)acrylate, bis(3,4-epoxycyclohexylmethyl)adipate, 4-vinylcyclohexene dioxide, vinylcyclohexene monoxide, 1,4-cyclohexanedimethanol diglycidyl ether, and 2,2'-((1-methylethylidene)bis(cyclohexane-4,1-diyloxymethylene)) bisoxirane.

Preferably, the crosslinking agent may be one or two or more selected from (3,4-epoxycyclohexyl)methyl-3',4'-epoxycyclohexanecarboxylate and bis(3,4-epoxycyclohexylmethyl)adipate) including a compound in which two 3,4-epoxycyclohexyl groups are connected.

In the present exemplary embodiment, a content of the crosslinking agent is not particularly limited. For example, the crosslinking agent may be included in an amount of 5 to 150 parts by weight with respect to 100 parts by weight of the epoxy-siloxane resin. In addition, according to an exemplary embodiment of the present invention, the crosslinking agent may be included in an amount of 3 to 30 wt %, and preferably in an amount of 5 to 20 wt %, with respect to a total weight of the composition for forming a coating layer. Within the above range, coatability and curing reactivity of the composition for forming a coating layer may be improved.

In the present exemplary embodiment, the initiator may be a photoinitiator or a thermal initiator. The initiator may be preferably a photoinitiator. For example, the photoinitiator may include a photo-cationic initiator. The photo-cationic initiator may initiate polymerization of the epoxy-siloxane resin and an epoxy-based monomer.

Specifically, the photo-cationic initiator may be one or more selected from an onium salt and an organic metal salt, but is not limited thereto. For example, the photo-cationic initiator may be one or more selected from a diaryliodonium salt, a triarylsulfonium salt, an aryldiazonium salt, and an iron-arene complex, but is not limited thereto.

In the present exemplary embodiment, a content of the photoinitiator is not particularly limited. For example, the photoinitiator may be included in an amount of 1 to 15 parts by weight with respect to 100 parts by weight of the epoxy-siloxane resin. In addition, according to an exemplary embodiment of the present invention, the photoinitiator may be included in an amount of 0.1 to 10 wt %, and preferably in an amount of 0.3 to 5 wt %, with respect to a total weight of the composition for forming a coating layer. When the content of the photoinitiator is within the above range, curing efficiency of the hard coating layer may be excellent and deterioration of the physical properties due to residual components after curing may be prevented.

In the present exemplary embodiment, the composition for forming a coating layer may further include one or more additives selected from a filler, a slip agent, a photostabilizer, a thermal polymerization inhibition agent, a leveling agent, a lubricant, an antifoulant, a thickener, a surfactant, an antifoaming agent, an antistatic agent, a dispersant, an initiator, a coupling agent, an antioxidant, a UV stabilizer, and a colorant, but the present invention is not limited thereto.

Inorganic particles may be further included in the hard coating layer to impart hardness. The inorganic particles may be preferably silica, and more preferably silica subjected to a surface treatment, but the present invention is not limited thereto. In this case, the surface treatment may be performed in the presence of a functional group capable of reacting with the crosslinking agent.

According to an exemplary embodiment, an average particle diameter of the inorganic particles may be 1 to 500 nm, and preferably 10 to 300 nm, but is not limited thereto.

In the present exemplary embodiment, the window cover film may further include a substrate layer. The substrate layer may be formed on the other surface of the polyimide-based film on which the coating layer is not formed.

In the present exemplary embodiment, the polyimide-based film may be laminated on the substrate layer after being produced as a film, or may be laminated after applying a polyamic acid resin composition which is a precursor of the polyimide-based film to be coated, but is not particularly limited as long as it may form a lamination configuration described above.

In the present exemplary embodiment, the substrate layer is not particularly limited as long as it is a substrate film of the window cover film, but, for example, may include one or more selected from an ester-based polymer, a carbonate-based polymer, a styrene-based polymer, and an acryl-based polymer. As a specific example, the substrate layer may include one or more selected from polyethylene terephthalate, polyethylene naphthalate, polybutylene terephthalate, polybutylene naphthalate, polycarbonate, polystyrene, and polymethylmethacrylate, but the present invention is not limited thereto.

In the present exemplary embodiment, the substrate layer may be a single layer or a multi-layer in which two or more layers are laminated. Specifically, the substrate layer may be obtained by laminating an optical adhesive layer on an interface of two or more substrate films.

In the present exemplary embodiment, a thickness of the substrate layer may be 50 to 300 μm. The thickness of the substrate layer may be preferably 100 to 300 μm, and more preferably 150 to 250 μm. When the thickness of the substrate layer is within the above range, the substrate layer may satisfy mechanical physical properties, and a distortion phenomenon of light may be significantly reduced when laminating the polyimide-based film.

In the present exemplary embodiment, as a specific example, the optical adhesive layer may include one or more selected from an optical clear adhesive (OCA), an optical clear resin (OCR), and a pressure sensitive adhesive (PSA), but the present invention is not limited thereto.

In the present exemplary embodiment, the window cover film may further include a second optical adhesive layer on an interface between the substrate layer and the polyimide-based film.

Specifically, a material of the second optical adhesive layer formed on the interface between the substrate layer and the polyimide-based film may be the same as or different from a material of the optical adhesive layer in the substrate layer. For example, a thickness of the second optical adhesive layer may be 20 to 120 µm. The thickness of the second optical adhesive layer may be preferably 20 to 80 µm.

Still another exemplary embodiment of the present invention provides a display panel and a display device including the window cover film formed on the display panel.

In the present exemplary embodiment, the display device is not particularly limited as long as it belongs to a field requiring excellent optical properties, and may be provided by selecting a display panel appropriate therefor. Preferably, the window cover film may be applied to a flexible display device. As a specific example, the window cover film may be included and applied to one or more image display devices selected from various image display devices such as a liquid crystal display device, an electroluminescence display device, a plasma display device, and a field emission display device, but the present invention is not limited thereto.

Hereinafter, the present invention will be described with reference to specific Examples and Comparative Examples. The following Examples are illustrative only to describe the technical idea of the present invention, and those skilled in the art will appreciate that the present invention is not limited to the following Examples.

1) Phase Difference Value According to In-Plane Incident Angle and Azimuth Angle A phase difference value was measured at a wavelength of 550 nm and a circular beam spot size of 1 mm using an Axoscan of Axometrics, Inc. In order to measure a phase difference of a full azimuth angle, a film to be measured was fixed to an upper portion of a sample stage (tip-tilt stage) and a phase difference was measured while changing an angle of the stage according to angles (θ: inclination angle, and ψ: azimuth angle). The phase difference was measured while changing the inclination angle of 0° to 50° at an interval of 5° and the azimuth angle of 0° to 360° at an interval of 5°.

2) Transmission Mura

White light was turned on using an I-Phone X (Apple Inc.) and a mura phenomenon according to each viewing angle was observed in a state where the produced polyimide-based film was laminated on the upper portion of the sample stage. Five people were selected and the mura phenomenon was observed in the same darkroom. A case where five people determined that it was good was evaluated as good (○), a case where fewer than four people determined that it was good was evaluated as slightly bad (Δ), and a case where fewer than three people determined that it was good was evaluated as bad (×).

3) Weight Average Molecular Weight

A weight average molecular weight of the film was measured by dissolving the film in a DMAc eluent containing 0.05 M LiBr. Waters GPC system, Waters 1515 isocratic HPLC Pump, and Waters 2414 Refractive Index detector were used as GPC, an Olexis, a Polypore, and a mixed D column were connected to each other and used as a column, polymethyl methacrylate (PMMA STD) was used as a standard material, and the analysis was performed at 35° C. and a flow rate of 1 mL/min.

4) Modulus/Elongation at Break

A modulus and an elongation at break were measured under a condition in which the polyamide-imide film having a length of 50 mm and a width of 10 mm was pulled according to ASTM D882 at 25° C. and 50 mm/min using a UTM 3365 (Instron Corporation).

A thickness of the film was measured, and data of a value thereof was input to the device. A unit of the modulus is GPa, and a unit of the elongation at break is %

5) Light Transmittance

For the film having a thickness of 50 µm, a total light transmittance measured in the entire wavelength region of 400 to 700 nm and a single wavelength light transmittance measured at 338 nm were measured according to the ASTM D1746 standard using a spectrophotometer (COH-400, Nippon Denshoku Industries Co., Ltd.) and a UV/Vis (UV3600, Shimadzu Corporation), respectively. A unit of the light transmittance is %.

6) Haze

A haze of the film having a thickness of 50 µm was measured according to the ASTM D1003 standard using the spectrophotometer (COH-400, Nippon Denshoku Industries Co., Ltd.). A unit of the haze is %.

7) Yellow Index (YI) and b* Value

A yellow index and a b* value of the film having a thickness of 50 µm were measured according to the ASTM E313 standard using a colorimeter (ColorQuest XE, Hunter Associates Laboratory, Inc.).

8) Pencil Hardness 20 mm of a line was drawn on the film according to JIS K5400 at a load of 750 g and a rate of 50 mm/sec, and the drawing of the line was repeated 5 times or more, to measure a pencil hardness when scratches were generated one or fewer times.

EXAMPLE 1

Isophthaloyl chloride (IPC), terephthaloyl chloride (TPC), and 2,2'-bis(trifluoromethyl)-benzidine (TFMB) were mixed with a solution in which dichloromethane and pyridine were mixed with each other in a molar ratio (IPC:TPC:TFMB) of 120:160:380, and stirring was performed in a reactor under a nitrogen atmosphere at 25° C. for 2 hours. A solid content was 10 wt %. After the reaction, the reactant was precipitated in water and then filtered, and the solid content was vacuum-dried at 50° C. for 6 hours or longer, thereby obtaining an oligomer. A formula weight (FW) of the oligomer was 11,580 g/mol.

N,N-dimethylacetamide (DMAc) as a solvent, 100 moles of the oligomer, and 20 moles of 2,2'-bis(trifluoromethyl)-benzidine (TFMB) were injected into the reactor and stirring was sufficiently performed. After confirming that the solid raw material was completely dissolved, fumed silica (surface area: 95 m$^2$/g, <1 µm) was added to DMAc in an amount of 1,000 ppm with respect to the solid content, and the fumed silica was dispersed using ultrasonic waves and then injected into the reactor. 120 moles of cyclobutanetetracarboxylic dianhydride (CBDA) were injected, stirring was sufficiently performed, and then polymerization was performed at 40° C. for 10 hours. A solid content was 20 wt %.

Subsequently, pyridine and acetic anhydride were sequentially added to a solution, respectively, at 2.5-fold moles relative to a total content of the dianhydride, stirring was performed at 60° C. for 12 hours, the mixture was precipitated in an excessive amount of methanol and then filtered, and vacuum-drying was performed at 50° C. for 6 hours or longer, thereby obtaining a polyamide-imide powder. The powder was diluted and dissolved with DMAc at 20 wt % to prepare a polyimide-based resin solution. A weight average molecular weight and a polydispersity index (PDI) of the prepared resin solution were 280,000 g/mol and 2.28, respectively.

The resin solution was coated onto a PET substrate film at room temperature using a slot die at a shear rate of 120 s$^{-1}$ and an air gap of 1.0 mm at a lip portion of the slot die, drying was performed in a hot air drying section under conditions of a temperature of 140° C. and a wind speed of 15 m/s for 6 minutes, and then cooling was performed at room temperature.

A final film was produced by stretching the film obtained by coating the resin solution to 102% in a machine direction at 170° C., additionally stretching the film to 103% at a speed at which the film entered into a stretching region at 210° C., and shrinking and stretching the film to 100.5% at the speed at which the film entered into the stretching region at 230° C. A thickness of the film was 49 μm.

EXAMPLE 2

A film was produced in the same manner as that of Example 1 except that the wind speed in the drying section was 10 m/s.

EXAMPLE 3

A film was produced in the same manner as that of Example 1 except that the wind speed in the drying section was 5 m/s.

EXAMPLE 4

A film was produced in the same manner as that of Example 1 except that the wind speed in the drying section was 2.5 m/s.

COMPARATIVE EXAMPLE 1

A film was produced in the same manner as that of Example 1 except that the wind speed in the drying section was 1.0 m/s.

COMPARATIVE EXAMPLE 2

A film was produced in the same manner as that of Example 1 except that the shear rate was 30 s$^{-1}$, the wind speed in the drying section was 30.0 m/s, and the thickness of the final film was 99.8 um.

In the case of each of the films produced in Examples 1 to 4 and Comparative Examples 1 and 2, a light transmittance measured at 388 nm was 65 to 75%, a total light transmittance was 89.5 to 90.5%, a haze was 0.4 to 0.8%, a yellow index (YI) was 1.4 to 1.6, a b* value was 0.8 to 1.0, a modulus was 6.0 to 6.5 GPa, an elongation at break was 15% or more, and a pencil hardness was HB/750 g, which showed that properties of each item were measured at a similar level.

In addition, a phase difference value according to an in-plane incident angle and an azimuth angle and a transmission mura of each of the films produced in Examples 1 to 4 and Comparative Examples 1 and 2 were evaluated. The results are shown in Table 1.

TABLE 1

| | | Expression 1 (based on θ = 5°) | | | Expression 2 | | |
|---|---|---|---|---|---|---|---|
| | $R_0$ (nm) | Left term | Right term | Determination of satisfaction | Value | Determination of satisfaction | Transmission mura |
| Example 1 | 50 | 63.2 | 176.5 | Satisfied | 4.2% | Satisfied | ○ |
| Example 2 | 100 | 113.8 | 352.8 | Satisfied | 8.3% | Satisfied | ○ |
| Example 3 | 200 | 213.7 | 705.2 | Satisfied | 16.7% | Satisfied | ○ |
| Example 4 | 400 | 413.3 | 1,411.3 | Satisfied | 33.2% | Satisfied | ○ |
| Comparative Example 1 | 800 | 813.6 | 2,824.0 | Satisfied | 68.0% | Not satisfied | x |
| Comparative Example 2 | 10 | 72.4 | 35.3 | Not satisfied | 0.2% | Satisfied | Δ |

The present invention provides a polyimide-based (polyimide is a term including polyimide or polyamide-imide) film having the above physical properties. The polyimide-based film hardly causes a mura phenomenon. In addition, the window cover film including the polyimide-based film also does not substantially cause a mura phenomenon.

Further, an object of the present invention is to provide a display panel produced using the polyimide-based film having the above physical properties.

Further, an object of the present invention is to provide a polyimide-based film as an optical film which does not substantially cause a mura phenomenon, a rainbow phenomenon, and a blackout phenomenon, a window cover film including the same, and a display panel including the same.

Further, an object of the present invention is to provide a polyimide-based film used for an optical application such as a cover window, which does not cause optical stains such as a rainbow phenomenon and a mura phenomenon that occur according to a viewing angle, and has excellent optical properties such as visibility, a window cover film including the same, and a display device including the same.

In addition, it is more preferable that the polyimide-based film of the present invention has a modulus measured according to ASTM D882 of 3 GPa or more, an elongation at break measured according to ASTM D882 of 8% or more, a light transmittance measured at 388 nm according to ASTM D1746 of 80% or less, a total light transmittance measured at 400 to 700 nm according to ASTM D1746 of 87% or more, a haze of 2.0% or less, a yellow index of 5.0 or less, and a b* value of 2.0 or less.

Hereinabove, although the present invention has been described by specific matters, exemplary embodiments, and drawings, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to these exemplary embodiments, but the claims and all modifications equal or equivalent to the claims are intended to fall within the scope and spirit of the present invention.

What is claimed is:

1. A polyimide-based film satisfying the following Expressions 1 and 2, $$\text{Max}[R(\theta, \psi_{0 \text{ to } 360°})] < R_0 \times [\sin(\theta)\cos(0) + 5\sin(\theta) + 1]^3 \quad \text{[Expression 1]}$$

wherein $R_0$ represents an in-plane phase difference ($R_{in}$) when light is incident perpendicularly to the polyimide-based film ($\theta = 0°$), $\theta$ represents an inclination angle of the incident light, $\psi$ represents an azimuth angle, $R(\theta, \psi)$ represents a phase difference according to an incident angle, and $\text{Max}[R(\theta, \psi_{0 \text{ to } 306°})]$ represents a maximum phase difference value among phase difference values measured with the fixed inclination angle $\theta$ and the azimuth angle $\psi$ of 0° to 360° at an interval of 5°, $$1 - \text{Min}[R(\theta_{50°}, \psi_{0 \text{ to } 360°})] / \text{Avg}[R(\theta_{50°}, \psi_{0 \text{ to } 360°})] \leq 50\% \text{ or}$$
$$\text{Max}[R(\theta_{50°}, \psi_{0 \text{ to } 360°})] / \text{Avg}[R(\theta_{50°}, \psi_{0 \text{ to } 360°})] - 1 \leq 50\% \quad \text{[Expression 2]}$$

wherein $\text{Min}[R(\theta_{50°}, \psi_{0 \text{ to } 360°})]$, $\text{Avg}[R(\theta_{50°}, \psi_{0 \text{ to } 360°})]$, and $\text{Max}[R(\theta_{50°}, \psi_{0 \text{ to } 360°})]$ represent a minimum phase difference, an average phase difference, and a maximum phase difference, respectively, among phase difference values measured with the fixed inclination angle of 50° and the azimuth angle $\psi$ of 0° to 360° at an interval of 5°, and wherein the polyimide-based film is prepared from a polyamide-imide based resin comprising a polyamide-imide polymer derived from an amine-terminated polyamide oligomer derived from a first fluorine-based aromatic diamine and aromatic diacid dichloride; a second fluorine-based aromatic diamine; and an aliphatic cyclic dianhydride.

2. The polyimide-based film of claim 1, wherein the polyimide-based film has a modulus measured according to ASTM D882 of 3 GPa or more.

3. The polyimide-based film of claim 1, wherein the polyimide-based film has an elongation at break of 8% or more, a light transmittance measured at 388 nm according to ASTM D1746 of 80% or less, a total light transmittance measured at 400 to 700 nm according to ASTM D1746 of 87% or more, a haze of 2.0% or less, a yellow index of 5.0 or less, and a b* value of 2.0 or less.

4. The polyimide-based film of claim 1, wherein the polyimide-based film has a modulus measured according to ASTM D882 of 3 GPa or more and an elongation at break measured according to ASTM D882 of 8% or more.

5. The polyimide-based film of claim 1, wherein a thickness of the polyimide-based film is 10 to 500 μm.

6. A window cover film comprising:
the polyimide-based film of claim 1; and
a coating layer formed on one surface of the polyimide-based film.

7. The window cover film of claim 6, wherein the coating layer is one or more selected from an antistatic layer, an anti-fingerprint layer, an anti-fouling layer, an anti-scratch layer, a low-refractive layer, an anti-reflective layer, and an impact absorption layer.

8. A flexible display panel comprising the polyimide-based film of claim 1.

9. The polyimide-based film of claim 1, wherein the first fluorine-based aromatic diamine and the second fluorine-based aromatic diamine are the same.

10. The polyimide-based film of claim 1, wherein a content of the amine-terminated polyamide oligomer with respect to the entire diamine monomer is 70 mol % or more.

* * * * *

UNITED STATES PATENT AND TRADEMARK OFFICE
CERTIFICATE OF CORRECTION

| | | |
|---|---|---|
| PATENT NO. | : 12,104,056 B2 | |
| APPLICATION NO. | : 17/233619 | |
| DATED | : October 1, 2024 | |
| INVENTOR(S) | : Sun Kug Kim et al. | |

It is certified that error appears in the above-identified patent and that said Letters Patent is hereby corrected as shown below:

In the Claims

Column 19, Line 23, Claim 1, delete "cos(0)" and insert -- $\cos(\theta)$ --

Signed and Sealed this
Tenth Day of December, 2024

*Katherine Kelly Vidal*

Katherine Kelly Vidal
*Director of the United States Patent and Trademark Office*